United States Patent
Puchosic et al.

(10) Patent No.: US 10,907,945 B2
(45) Date of Patent: Feb. 2, 2021

(54) BULLET LOADER

(71) Applicants: Gary Lee Puchosic, Orange Park, FL (US); Michael Wallale Hansen, Jacksonville, FL (US)

(72) Inventors: Gary Lee Puchosic, Orange Park, FL (US); Michael Wallale Hansen, Jacksonville, FL (US)

( * ) Notice: Subject to any disclaimer, the term of this patent is extended or adjusted under 35 U.S.C. 154(b) by 0 days.

(21) Appl. No.: 16/734,365

(22) Filed: Jan. 5, 2020

(65) Prior Publication Data

US 2020/0393227 A1     Dec. 17, 2020

Related U.S. Application Data

(60) Provisional application No. 62/788,791, filed on Jan. 5, 2019.

(51) Int. Cl.
| | | |
|---|---|---|
| *F42B 33/00* | (2006.01) | |
| *B65G 47/248* | (2006.01) | |

(52) U.S. Cl.
CPC .......... *F42B 33/002* (2013.01); *B65G 47/248* (2013.01)

(58) Field of Classification Search
CPC ....... F42B 33/002; F42B 33/00; B65G 47/248
USPC ..................................... 86/45, 23, 46, 43, 24
See application file for complete search history.

(56) References Cited

U.S. PATENT DOCUMENTS

| | | | | |
|---|---|---|---|---|
| 1,739,996 | A * | 12/1929 | White ................. | A43D 100/08 221/243 |
| 2,371,126 | A * | 3/1945 | Best et al. ......... | B65G 47/1457 86/54 |
| 3,430,808 | A * | 3/1969 | Matthews ............... | G05D 9/12 221/10 |
| 3,628,273 | A * | 12/1971 | Lach ..................... | F42B 33/002 42/87 |
| 3,659,492 | A * | 5/1972 | Fullmer ............. | B65G 47/1457 86/46 |
| 4,312,438 | A * | 1/1982 | Vatsvog ................ | F42B 33/002 198/392 |
| 5,335,578 | A * | 8/1994 | Lorden ................. | F42B 33/002 86/25 |
| 7,497,155 | B2 * | 3/2009 | Koskela ................. | F42B 33/10 86/23 |
| 7,552,668 | B1 * | 6/2009 | Gonzalez ............... | F42B 33/00 86/45 |
| 7,665,490 | B1 * | 2/2010 | Elliott ................. | B29O 48/285 141/284 |
| 8,096,403 | B2 * | 1/2012 | Marti Sala ........... | B65G 47/256 198/384 |

(Continued)

*Primary Examiner* — Joshua E Freeman

(57) ABSTRACT

An improved bullet loader system applies bullets to a feed tube from a source of bullets. The bullets each have a tip-end and a base-end. The bullet-orienting system includes a bullet conveyance that conveys bullets, in tip-end-down and tip-end-up orientations, from a source of bullets to a feed tube along a bullet conveyance path. A bullet-orienting structure comprising a block, a nose guide forming a ledge, a groove, and a tapered opening, and a ramp is disposed at a fixed location proximate the bullet conveyance path. For each tip-end-down oriented bullet, the bullet-orienting structure interacts with the tip-end-down bullet, and flips the tip-end down bullet relative to the bullet conveyance from tip-end-down orientation to the tip-end-up orientation prior to application to the feed tube.

10 Claims, 15 Drawing Sheets

(56) References Cited

U.S. PATENT DOCUMENTS

| | | | | |
|---|---|---|---|---|
| 8,661,959 | B2* | 3/2014 | Koskela | F42B 33/002 86/45 |
| 9,879,960 | B2* | 1/2018 | Bergmann | F42B 33/002 |
| 9,989,342 | B1* | 6/2018 | Lougeay | F42B 33/002 |
| 10,718,599 | B1* | 7/2020 | Kirsch | F42B 33/001 |
| 2002/0121184 | A1* | 9/2002 | Fowler | F42B 33/002 86/45 |
| 2004/0025678 | A1* | 2/2004 | Shields | F42B 33/02 86/31 |
| 2008/0053297 | A1* | 3/2008 | Koskela | F42B 33/10 86/27 |
| 2013/0125737 | A1* | 5/2013 | Koskela | B65G 47/1457 86/45 |
| 2013/0152771 | A1* | 6/2013 | Coma Asensio | F42B 33/00 86/19.5 |
| 2016/0305726 | A1* | 10/2016 | Mokuolu | F41A 9/83 |
| 2016/0313103 | A1* | 10/2016 | Bergmann | F42B 33/002 |

* cited by examiner

BULLET LOADER

The instant application claims the benefit of the prior filing of U.S. Provisional Application to Puchosic et al, Ser. No. 62/788,791, filed Jan. 5, 2019. This provisional application is incorporated by reference as if it was recited herein in its entirety.

TECHNICAL FIELD

This application relates in general to an improvement to a bullet loader, and more specifically to improvements to existing automated bullet loaders utilizing a rotating wheel to properly orient various bullet caliber sizes being used in loading and reloading casings.

BACKGROUND

Ammunition consists of the projectiles and propelling charges used in small arms, artillery, and other guns. Ammunition size is usually expressed in terms of caliber, which is the diameter of the projectile as measured in millimeters or inches. In general, projectiles less than 20 mm or 0.60 inch in diameter are classified as small-arm, and larger calibers are considered artillery. A complete round of ammunition, which is referred to as a fixed type round, consists of all the components necessary for one firing of the gun. These normally included a projectile, the propellant, and a primer that ignites the propellant. Other components such as the cartridge case, fuse, bursting charge, and lubricant are frequently included.

Modern small-arms ammunition is nearly always of the fixed type. Complete rounds are usually called cartridges, and projectiles are called bullets. Cartridge cases or shells are most commonly made of brass, although steel is also widely used. Many varieties of bullets are cast from lead and can have lubricant or grease grooves formed on the bullet outer surface.

Handloading is the process used to create firearm cartridges by hand versus those put together en masse and sold commercially, generally in packages of 6 to 50. When previously-fired cases or shells are used, the process is often called reloading. Specific details of handloading and reloading can be found in U.S. Pat. Nos. 8,661,959, 7,497,155 and 7,549,364, issued to Richard Koskela, the disclosures of which are incorporated herein by reference.

After casting bullets from lead, it can be desirable to apply lubricant to any lubricant or grease grooves formed on the bullets' outer surfaces. Lubricant is applied to the bullet so that when a bullet is fired, the lubricant is transferred along the passage of the bullet down a rifled bore. Generally, lubricant is transferred from the bullet grease groove to the bore surface through compression, linear acceleration, and radial acceleration when the bullet is fired. Additionally, lubricant is injected forward during the firing process due to high-pressure gas leakage into the lubrication groove.

Some methods and apparatuses useful for applying lubricant require a bullet to be oriented with its tip-end facing down. Additionally, other bullet or projectile systems also may require a tip-end-down oriented bullet. Acceptable means for dispensing tip-end-down oriented bullets are not found in the prior art. The prior art includes inefficient devices that simply reject improperly oriented bullets rather than reorient them and devices that are simply to large or expensive for smaller applications. Unfortunately, while skilled artisans have devoted considerable effort toward the development and improvement of bullet-orienting systems, current efforts have not yielded entirely acceptable results, without need for complex configuration of bullet loader apparatus for each bullet caliber sizes. Given the deficiencies prevalent in the art, the need for continued improvement is evident.

The present invention attempts to address the existing limitations in bullet loaders when configured for various caliber sized bullets according to the principles and example embodiments disclosed herein.

SUMMARY

In accordance with the present invention, the above and other problems are solved by providing an apparatus for improved operation as a configurable bullet loader.

In one embodiment, the present invention is an apparatus bullet-orienting apparatus for orienting bullets comprising a tip-end and a base-end. The apparatus having a bullet conveyance comprising a wheel having a perimeter defining one or more notches wherein each notch is sized to accommodate a bullet resting with either its tip-end or its base-end facing a nose plate when the notch is positioned above the nose plate, and a bullet-orienting structure positioned adjacent the bullet conveyance such that a bullet conveyed from an upstream location to a downstream location by the bullet conveyance interacts with the bullet-orienting structure. The bullet-orienting structure includes the nose plate that extends at least partially below the wheel and being movable relative to the wheel, wherein the nose plate defines a tapered opening and a groove having a first end and a second end, wherein the first end of the groove is disposed adjacent to the tapered opening and wherein the tapered opening is positioned such that it is partially extends beneath the perimeter of the wheel and such that a bullet positioned in a notch of the wheel and oriented with its tip-end facing toward the tapered opening would fall into the tapered opening and such that a bullet positioned in a notch of the wheel and oriented with its base-end facing toward the tapered opening would not fall into the tapered opening, a spacer adjacent to the nose plate below the wheel to orient the nose plate such that the groove is located in a position corresponding to a bullet caliber size to be processed, and a fixed location ramp having a first end and a second end, wherein the first end of the ramp is disposed adjacent to the second end of the groove, wherein the ramp is positioned downstream from the tapered opening, and wherein a bullet positioned in a notch with its base-end facing toward the tapered opening would interact with the ramp. The fixed location ramp comprises either a pistol bullet ramp and a rifle bullet ramp.

In a second embodiment, the present invention is an apparatus including a bullet conveyance conveying bullets along a bullet conveyance path from an upstream location to a bullet-receiving opening at a downstream location, the bullets each including a tip end having a first width and a base end having a second width greater than the first width, the bullet conveyance taking up the bullets in tip down and tip up orientations whereby each of the bullets taken up by the bullet conveyance in the tip up orientation comprises a tip up bullet and each of the bullets taken up by the bullet conveyance in the tip down orientation comprises a tip down bullet; and bullet-orienting structure interacting with each tip down bullet conveyed along the bullet conveyance path by the bullet conveyance between the upstream location and the downstream location rotating each tip down bullet relative to the bullet conveyance from the tip down orientation to the tip up orientation. The bullet-orienting structure includes: a nose plate that extends at least partially below the wheel and being movable relative to the wheel, wherein the nose plate defines a tapered opening and a groove having a first end and a second end, wherein the first end of the groove is disposed adjacent to the tapered opening and wherein the tapered opening is positioned such that it is partially extends beneath the perimeter of the wheel and such that a bullet positioned in a notch of the wheel and oriented with its tip-end facing toward the tapered opening would fall into the tapered opening and such that a bullet positioned in a notch of the wheel and oriented with its base-end facing toward the tapered opening would not fall into the tapered opening, a spacer adjacent to the nose plate below the wheel to orient the nose plate such that the groove is located in a position corresponding to a bullet caliber size to be processed, a rotating knob having a thru screw to attach the nose plate into a desired location after the spacer has been installed, a groove receiving the tip of each tip down bullet initially rotating each tip down bullet out of the tip down orientation toward the tip up orientation; and a fixed location ramp receiving the tip of each tip down bullet initially rotated from the groove rotating each tip down bullet into the tip up orientation; The fixed location ramp comprises a pistol bullet ramp and a rifle bullet ramp. The rifle bullet ramp includes: a longer outside ramp having a first front edge and a rising slope to a first back edge and a shorter inside ramp having a second front edge and a rising slope to a second back edge, the second back edge being adjacent to an intersection point along a front side of the longer outside ramp, and a front side of the shorter inside ramp oriented from the front side of the longer outside ramp at an angle of 45° measured between the first front edge and the second front edge. The pistol bullet ramp comprises a solid ramp having the following approximate dimensions: an outside height of 36.50 mm, an inside length of 42.45 mm, an outside edge radius length of 53.50 mm, an inside edge radius length of 42.45 mm, a front length of 22.80 mm, a back length of 26.00 mm, a lower edge length of 23.04 mm, and a front ledge height of 2.0 mm. The spacer comprises a solid item having a width corresponding to the bullet caliber size being processed. The wheel comprises a flat rotating disk and a handle coupled to a top side of the disk perpendicular to the top side of the disk.

The great utility of the invention is that that configuration of the apparatus for processing of various caliber sized bullets is simplified.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features that are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

Referring now to the drawings in which like reference numbers represent corresponding parts throughout.

DETAILED DESCRIPTION

Figure 1:
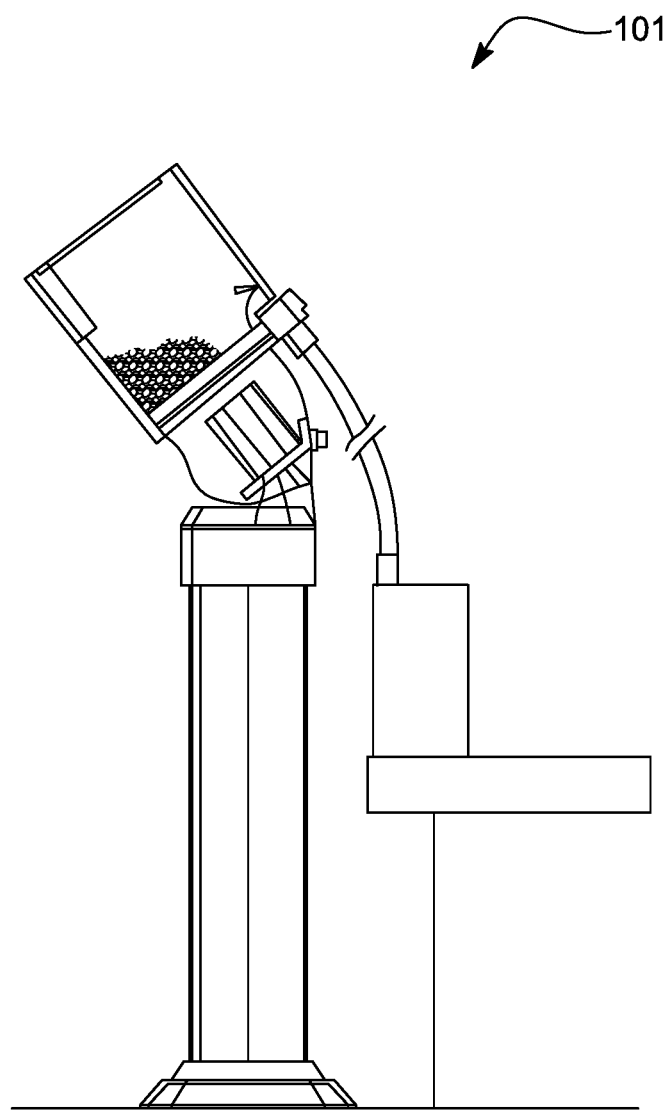
FIG. 1 represents a prior art representation of a prior art bullet loader improved by use of the present invention.

This application relates in general to a method and article of manufacture for providing an apparatus for providing a bullet loader.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

As used herein, the singular forms "a," "an," and "the" are intended to include the plural forms as well, unless the context clearly indicates otherwise. It further will be understood that the terms "comprises," "comprising," "includes," and "including" specify the presence of stated features, steps, or components but do not preclude the presence or addition of one or more other features, steps, or components. It also should be noted that in some alternative implementations, the functions and acts noted may occur out of the order noted in the figures. For example, two figures shown in succession may in fact be executed substantially concurrently or may sometimes be executed in the reverse order, depending upon the functionality and acts involved.

In general, the present disclosure relates to an apparatus for providing a bullet loader. More specifically to improvements to existing automated bullet loaders utilizing a rotating wheel to properly orient various bullet caliber sizes being used in loading and reloading casings.

To better understand the present invention, FIG. 1 represents a prior art representation of a prior art bullet loader improved by use of the present invention. The bullet loader 101 shown here is a Mr. BULLETFEEDER® automated bullet loader manufactured and sold by Double Alpha Academy of Orefield, PA and RAK Systems, LLC of Scottsdale, Ariz. The design and operation of the automated bullet loader 101 is described in detail in the previously referenced U.S. Pat. Nos. 8,661,959, 7,549,364, and 7,497,155, all to Koskela. FIG. 1 illustrates the entire automated bullet loader 101 as configured to load various caliber sized bullets into casings.

Figure 2:
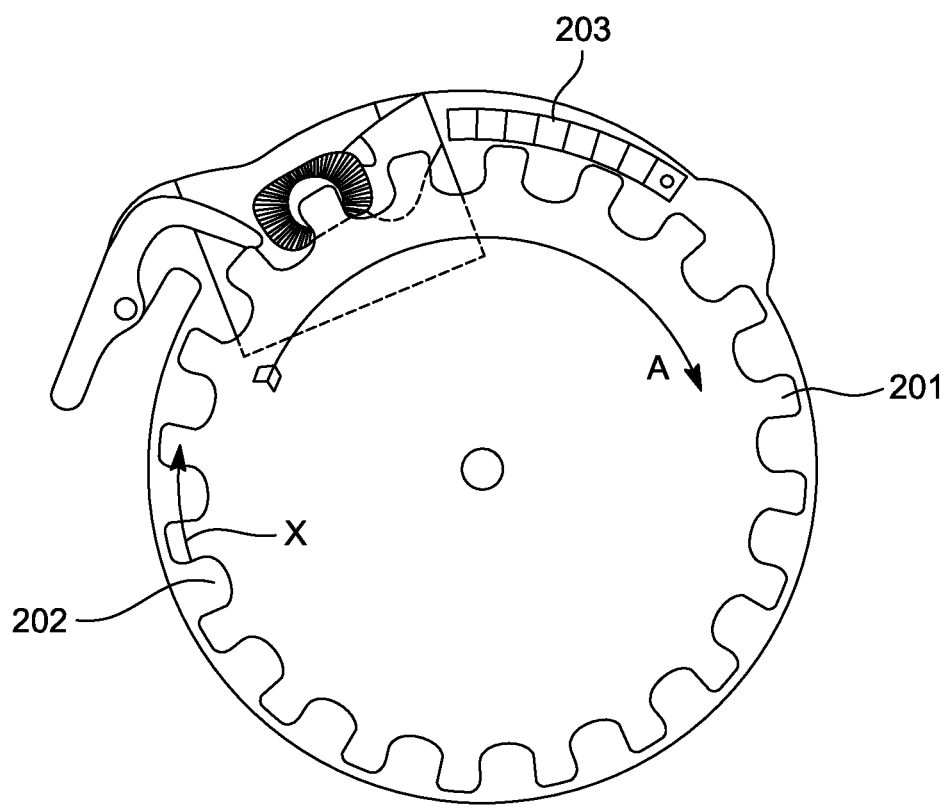
FIG. 2 illustrates a prior art representation of a wheel used within a bullet loader improved by the present invention.

FIG. 2 illustrates a prior art representation of a wheel used within a bullet loader improved by the present invention. The wheel 201 rotates in the direction of A with bullets falling into the spaces around the diameter of the wheel. As wheel 201 rotates, the bullets orientation gap 202 and bullet orientation ramp 203 which will ensure the orientation of the bullet as being tip upward as described in the above patents to Koskela.

Figure 3A:
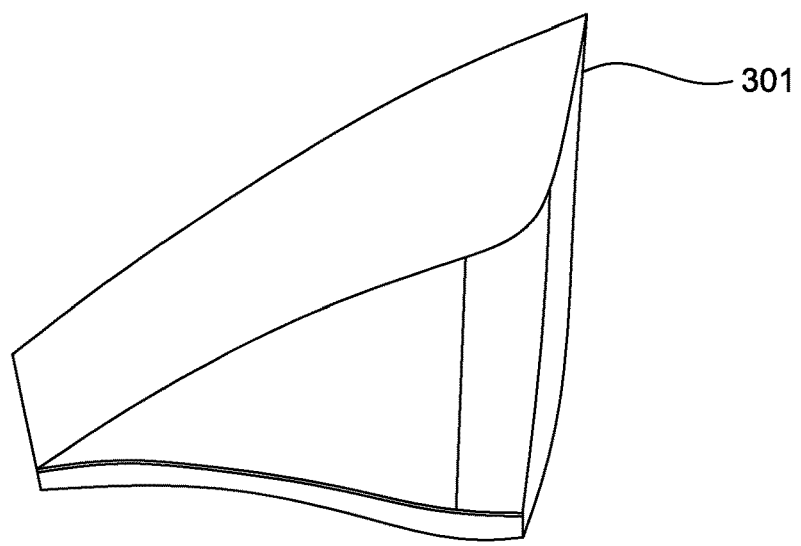
FIG. 3a-c illustrates various embodiments of a bullet orientation ramp according to the present invention.
Figure 3B:
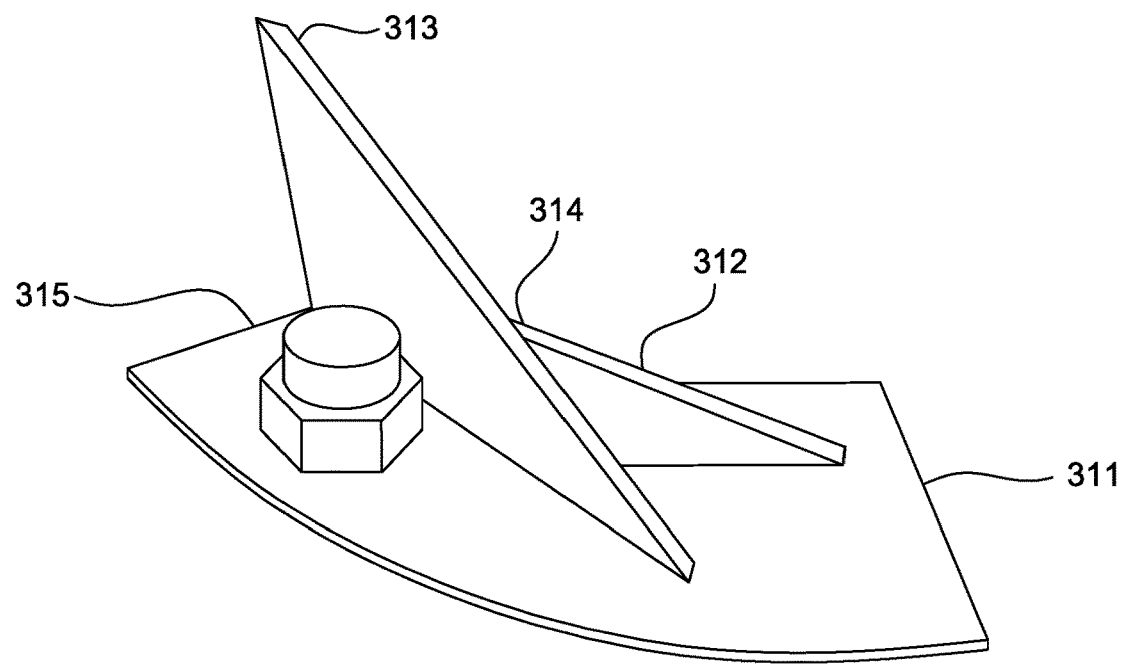
Figure 3C:
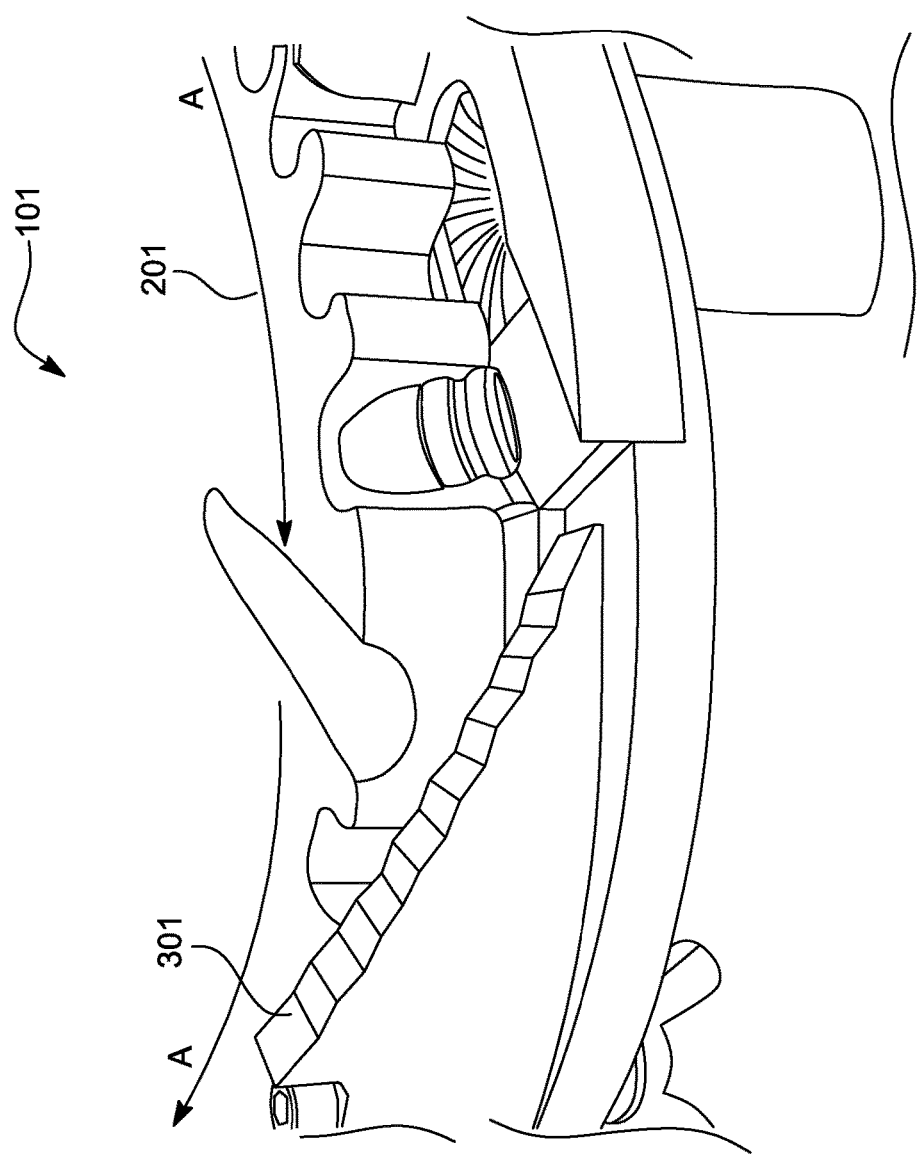
Figure 4A:
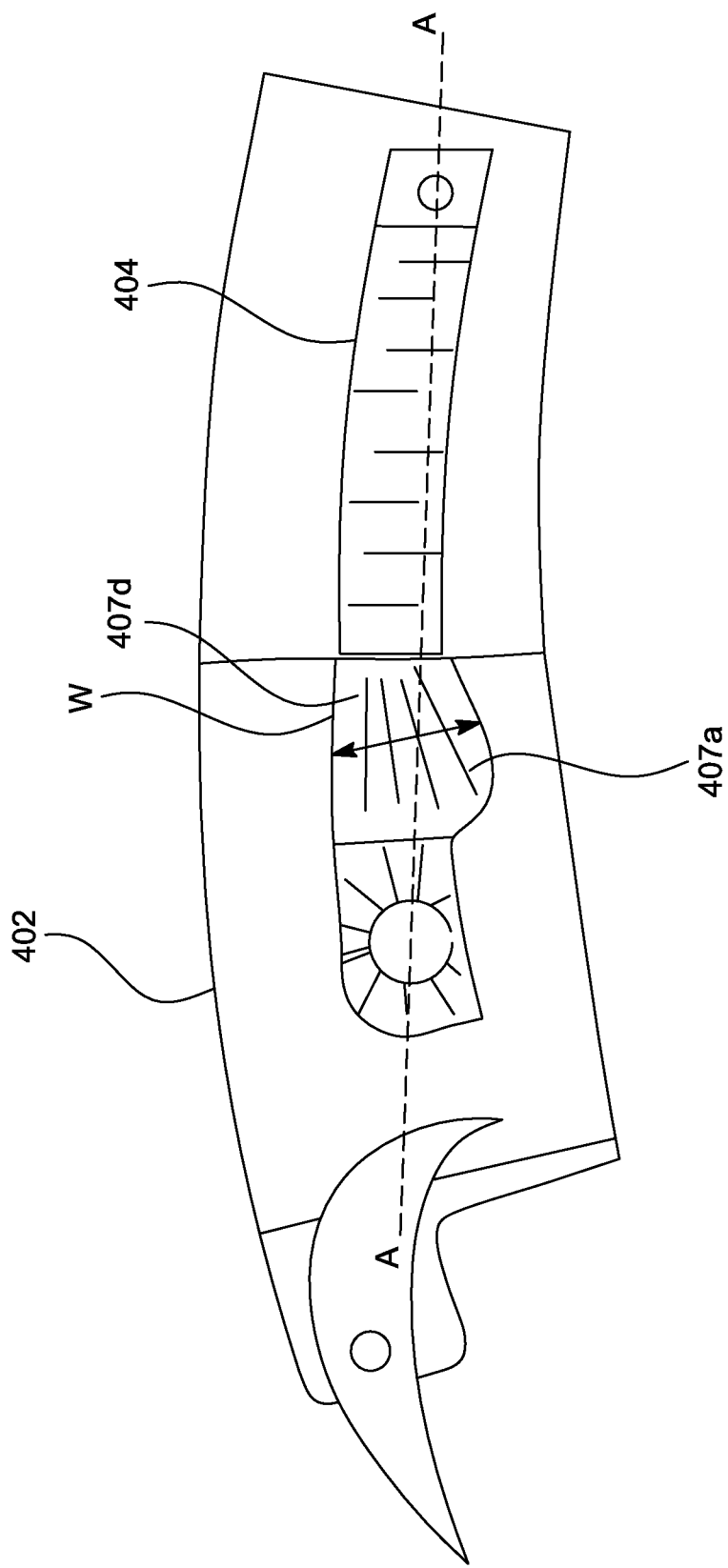
FIG. 4a-e illustrates various embodiments of a bullet orientation block utilizing varying sized spacers according to the present invention.
Figure 4B:
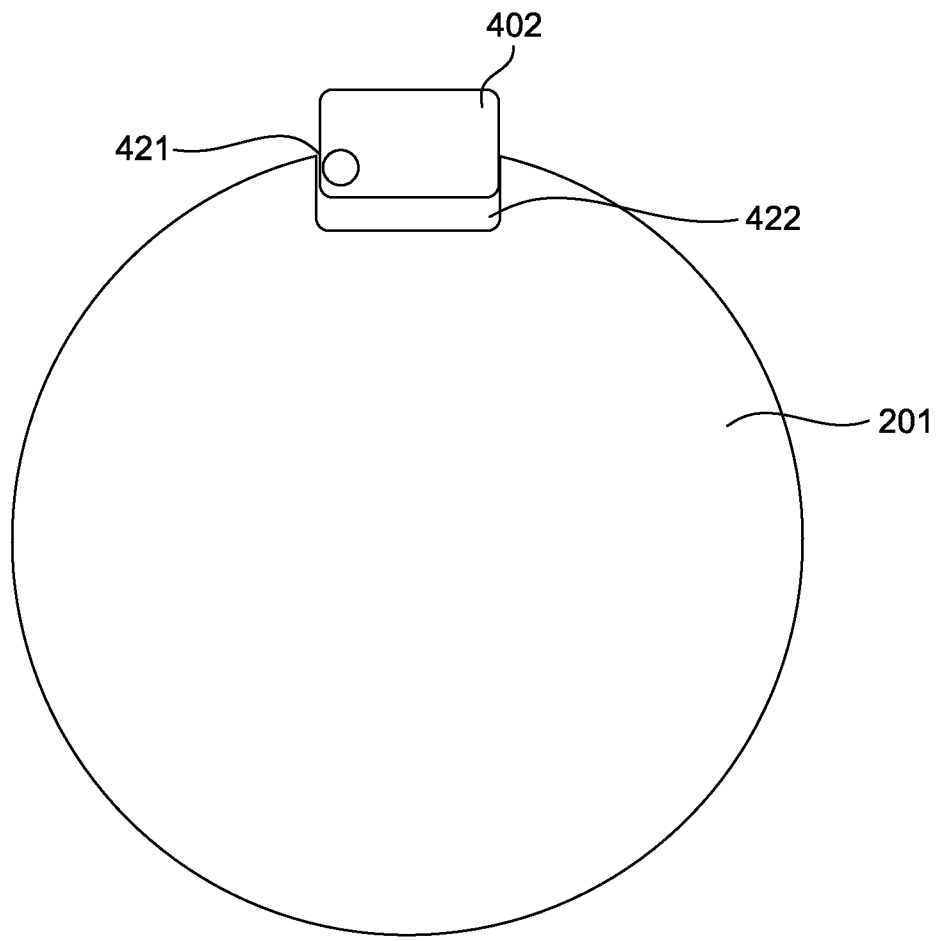
Figure 4C:
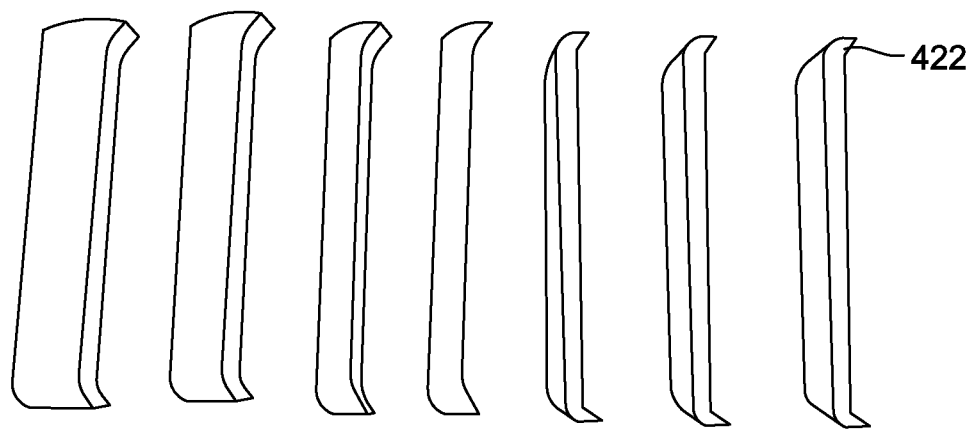
Figure 4D:
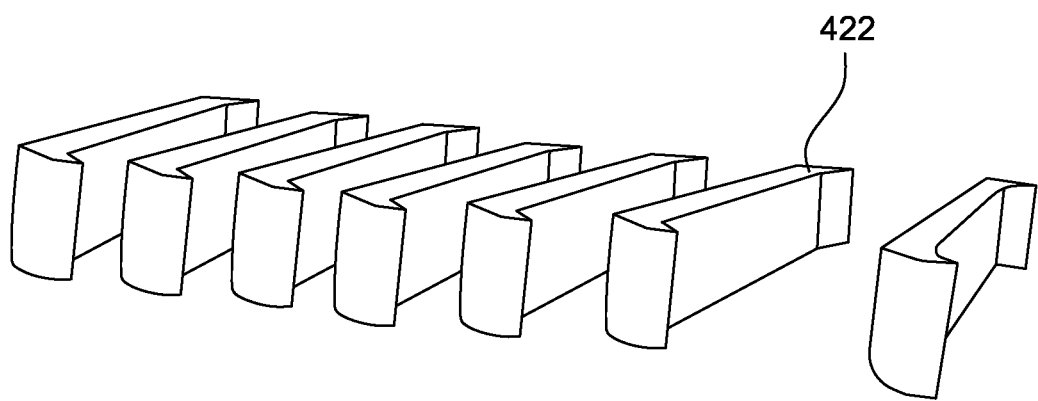
Figure 4E:
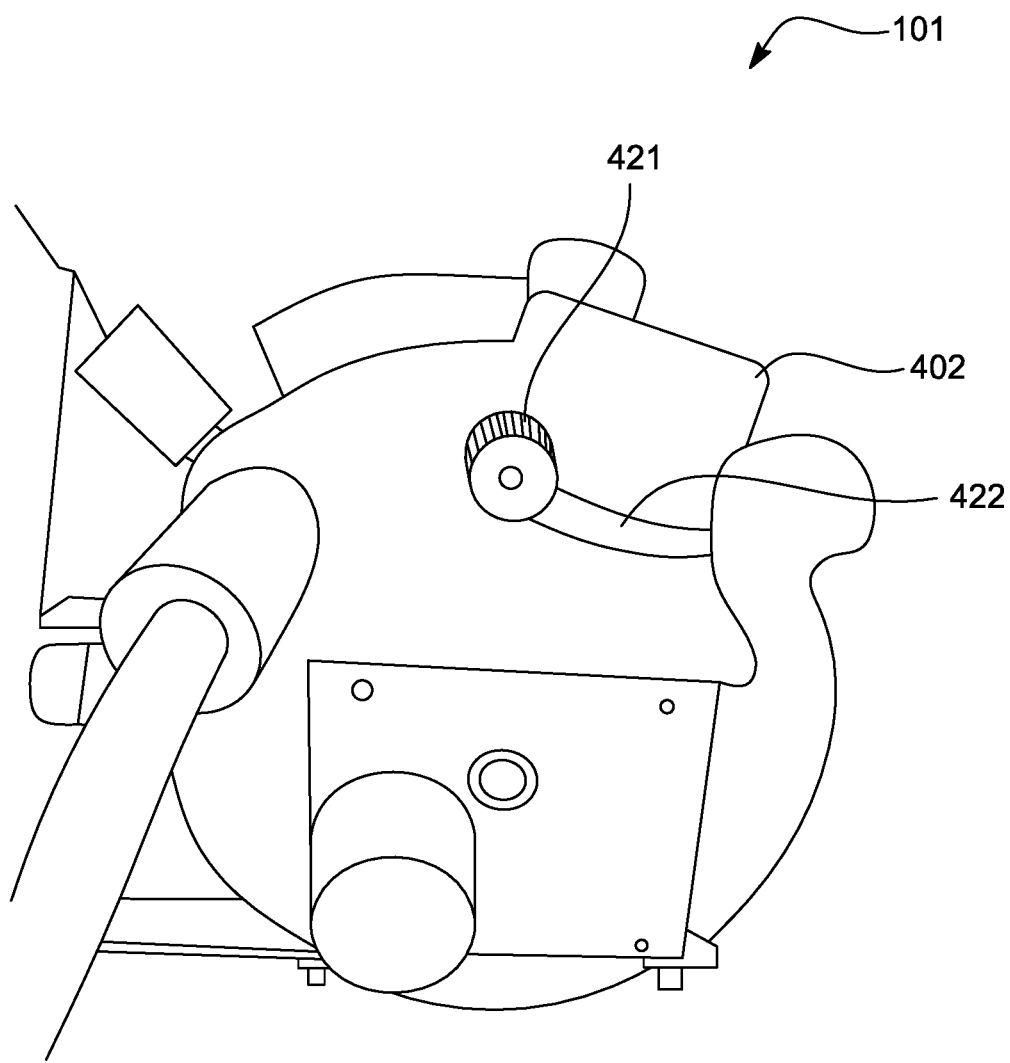

FIG. 3*a-c* illustrates various embodiments of a bullet orientation ramp according to the present invention. FIG. 3*a* illustrates a fixed bullet orientation ramp 301 useful for pistol bullets. The fixed bullet orientation ramp 301 is attached to a base element supporting the rotating wheel 201 within the bullet loader 101. In prior art systems, the fixed bullet orientation ramp 301 requires adjustment of its placement relative to the wheel 201 depending upon a caliber size bullet being processed at a given point in time. Different wheels 201 are used when a differing caliber bullet size is to be processed. When switching bullet caliber sizes, the wheel 201 corresponding to that particular caliber size is used.

When a wheel is changed, prior art fixed bullet orientation ramp 301 requires it to be configured to operate at a different distance from the wheel depending upon the length of the bullet caliber size. Such configuration may present difficulty in use and possible lead to operating errors. Use of the improved fixed bullet orientation ramp 301 disclosed herein permits the operation of bullet loader 101 with any caliber sized bullet and corresponding wheel 201 without replacement and configuration.

The improved fixed bullet orientation ramp 301 is shown in FIG. 3*a* and possesses the following dimensions in a preferred embodiment:

| | |
|---|---|
| Outside height 302 | 36.50 mm; |
| Inside length 303 | 42.45 mm; |
| Outside edge radius length 304 | 53.50 mm; |
| Inside edge radius length 305 | 42.45 mm; |
| Front Length 306 | 22.80 mm; |
| Back Length 307 | 26.00 mm; |
| Lower edge length 308 | 23.04 mm; and |
| Front ledge height 309 | 2.0 mm. |

Table 1 illustrates the pistol bullet caliber of example manufacturers relationship to the bullet orientation ramp and related components as described herein. Within Table 1, the ramp indications for Mr. Bullet refer to a ramp originally designed and included in a bullet loader as described in the patents to Koskela. References to Pistol for this ramp indications refer to the improved fixed bullet orientation ramp 301 described above.

TABLE 1

PISTOL PROFILE CHART & 7 Bullet Spacers

| CALIBER | BULLET WEIGHT | BULLET PROFILE | MANUFACTURER | SPACER | RAMP | SHIMS |
|---|---|---|---|---|---|---|
| 380 ACP | 95 Grain | RN | Montana Gold | 4 | Mr. Bullet | All |
| | 95 Grain | RN | Bayou Bullet | 4 | Mr. Bullet | All |
| | 105 Grain | FP | Bayou Bullet | 4 | Pistol | All |
| 9 mm | 115 Grain | RN | Berry's FMJ | 5 | Pistol | None |
| | 115 Grain | RN | Bayou Bullet | 5 | Pistol | None |
| | 115 Grain | CONE | Eggelston | 5 | Pistol | None |
| | 120 Grain | FP | Bayou Bullet | 5 | Pistol | None |
| | 124 Grain | CONE | Eggelston | 5 | Pistol | None |
| | 125 Grain | CONE | Any | 5 | Pistol | None |
| | 147 Grain | FP | Bayou Bullet | 5 | Pistol | None |
| | 147 Grain | RN | Eggelston | 5 | Pistol | None |
| | 147 Grain | RN | Berry's FMJ | 5 | Pistol | None |
| | 147 Grain | FP | Berry's FMJ | 4 | Pistol | None |
| 38 SPL | 125 Grain | XTP HP | Hornady | 4 | Pistol | None |
| 357 MAG | 140 Grain | XTP HP | Hornady | 4 | Pistol | None |
| | 145 Grain | SILVERTIP HP | Winchester | 4 | Pistol | None |
| | 158 Grain | XTP HP | Hornady | 4 | Pistol | None |
| | 158 Grain | SWC | Bayou Bullet | 5 | Pistol | None |
| | 160 Grain | RN | Bayou Bullet | 5 | Pistol | None |
| 357 SIG | See 9 mm bullets | | | | | |
| 40 S&W 10 mm | 155 Grain | RN | Bayou Bullet | 2 | Pistol | None |
| | 165 Grain | FP | Eggelston | 2 | Pistol | None |
| | 165 Grain | FP | Berry's FMJ | 2 | Pistol | None |
| | 180 Grain | RN | Magma Mold | 2 | Pistol | None |
| | 180 Grain | FP | Bayou Bullet | 2 | Pistol | None |
| | 180 Grain | FP | Eggelston | 2 | Pistol | None |
| | 180 Grain | FPRS | Berry's Plated | 2 | Pistol | None |
| | 180 Grain | JHP | Montana Gold | 2 | Pistol | None |
| | 180 Grain | RNFP | Winchester | 2 | Pistol | None |
| | 180 Grain | XTP HP | Hornady | 2 | Pistol | None |
| | 200 Grain | RN | Bayou Bullet | 2 | Pistol | None |
| 41 MAG | 210 Grain | SWC | Bayou Bullet | 1 | Pistol | 2 thick shims |
| | 215 Grain | SWC | Bayou Bullet | 1 | Pistol | 2 thick skims |
| | 220 Grain | SWC | SP Speer | 1 | Pistol | 1 thick shim |
| 44 SPL | 200 Grain | RNFP | Eggelston | 1 | Pistol | 2 thick shims |
| 44 MAG | 215 Grain | SWC | Bayou Bullet | 1 | Pistol | 2 thick shims |
| | 240 Grain | SWC | Bayou Bullet | 1 | Pistol | 1 thick shim |
| | 245 Grain | SWC | Lee Cast Bullet | 1 | Pistol | 1 thick shim |
| 45 LC | 200 Grain | RNFP | Bayou Bullet | 1 | Pistol | 2 thick shims |
| | 250 Grain | RNFP | Bayou Bullet | 1 | Pistol | 2 thick shims |
| | 255 Grain | SWC | Lee Cast Bullet | 1 | Pistol | 2 thick shims |
| 45 ACP | 200 Grain | FP | Berry's FMJ | 1 | Pistol | None |
| 45 GAP | 200 Grain | SWC | Eggelston | 2 | Pistol | None |
| | 200 Grain | RN | Bayou Bullet | 2 | Pistol | None |
| | 230 Grain | RN | Berry's FMJ | 2 | Pistol | None |

TABLE 1-continued

PISTOL PROFILE CHART & 7 Bullet Spacers

| CALIBER | BULLET WEIGHT | BULLET PROFILE | MANUFACTURER | SPACER | RAMP | SHIMS |
|---|---|---|---|---|---|---|
| | 230 Grain | RN | Eggelston | 2 | Pistol | None |
| | 230 Grain | RN | Bayou Bullet | 2 | Pistol | None |
| | 230 Grain | SWC | Berry's FMJ | 2 | Pistol | None |
| | 230 Grain | FPHB | Berry's FMJ | 1 | Pistol | None |
| | 230 Grain | RN | Frontier FMJ | 2 | Pistol | None |
| | 230 Grain | RN | Frontier CMJ | 2 | Pistol | None |
| | 230 Grain | XTP HP | Hornady | 1 | Pistol | None |

Pistol notes:
CONE - Conical shape
CMJ - Complete Metal Jacket
FP - Flat Point *
FPHB - Flat Point Hollow Base
FPRS - Flat Point Round Shoulder *
HP - Hollow Point
HPBT - Hollow Point Boat Tail
FMJ - Full Metal Jacket
*FP & FPRS - can also be referred to as TC - Truncated Cone
JHP - Jacketed Hollow Point
RN - Round Nose
RNFP - Round Nose Flat Point
SP - Soft Point
SWC - Semi Wad Cutter
XTP HP - Hornady Hollow Point Table 2 illustrates the rifle bullet caliber of example manufacturers relationship to the bullet orientation ramp of FIG. 3b and related components as described herein.

TABLE 2

RIFLE PROFILE CHART

| BULLET | PLATE | SPACER | SHIMS | RAMP |
|---|---|---|---|---|
| 30 Cal Bullets 308, 300 blackout, 300win mag, 30/30, 30 cal Bullets (size .308/.309) | | | | |
| Sierra Varminter 110 gr HP | 308 Half Plate | 5A | None | Rifle |
| Hornady V Max 110 gr | 308 Half Plate | 5A | None | Rifle |
| Hornady 110 gr FMJ | 308 Half Plate | 5A | None | Rifle |
| Speer 125 gr FMJ HP | 308 Full Plate | 5A | None | Rifle |
| Hornady V Max 150 gr FMJ | 308 Full Plate | 5A | None | Rifle |
| 163 gr FMJ AP | 308 Full Plate | 5A | None | Rifle |
| Sierra Game King 165 gr HPBT | 308 Full Plate | 5A | None | Rifle |
| Lyman CnC Bullet 168 gr FP | 308 Full Plate | 5A | None | Rifle |
| Nosler 170 gr BTFP | 308 Full Plate | 5A | None | Rifle |
| Sierra 170 gr FN | 308 Full Plate | 5A | None | Rifle |
| Speer 175 gr soft point | 308 Full Plate | 5A | None | Rifle |
| Barnes TTSX 180 gr Ballistic tip | 308 Full Plate | 5A | None | Rifle |
| Hornady 208 gr FMJ BTHP | 308 Full Plate | 5A | None | Rifle |
| Berrys 220 gr FMJ Spire Point | 308 Full Plate | 5A | None | Rifle |
| Lee CnC 230 gr Spire Point | 308 Full Plate | 5A | None | Rifle |
| Missouri Bullet 245 gr CnC FP | 308 Full Plate | 5A | None | Rifle |
| * The 308 bullet feeder plate splits in half due to the length of certain 30 cal bullets | | | | |
| 7 mm (size .284) | | | | |
| Hornady 120 gr Spire Point | 308 Full Plate | 5A | None | Rifle |
| Hornady 139 gr SST | 308 Full Plate | 5A | None | Rifle |
| Sierra Match King 175 gr HPBT | 308 Full Plate | 6 | None | Rifle |
| Sierra Match King 150 gr HPBT | 308 Full Plate | 6 | None | Rifle |
| ** 7 mm bullets should be run no faster than half speed for reliability | | | | |
| 303 British (size .311) | | | | |
| Sierra Match King 174 gr HPBT | 308 Full Plate | 6 | None | Rifle |
| AK 47 (size .311 or .312) | | | | |
| Berrys 123 gr Spire point | 308 Half Plate | 6 | All Shims | Rifle |

TABLE 2-continued

RIFLE PROFILE CHART

| BULLET | PLATE | SPACER | SHIMS | RAMP |
|---|---|---|---|---|
| 270 and 6.8 (size .277) | | | | |
| Remington 130 gr spritzer SP | 308 Full Plate | 5A | None | Rifle |
| Nosler 150 gr BT Ballistic tip | 308 Full Plate | 6 | None | Rifle |
| Hornady 130 gr spire point | 308 Full Plate | 6 | None | Rifle |
| Nosler 130 gr Ballistic Tip Spitzer | 308 Full Plate | 6 | None | Rifle |
| Hornady 110 gr BTHP | 308 Full Plate | 6 | None | Rifle |
| Nosier 115 gr BTHP | 308 Half Plate | 6 | None | Rifle |
| 243 and 6 mm (size .243/.244) | | | | |
| Nosler 90 gr Ballistic Tip Spitzer | 308 Full Plate | 6 | None | Rifle |
| Nosler 130 gr Ballistic Tip Spitzer | 308 Full Plate | 6 | None | Rifle |
| Nosler 100 gr Ballistic tip Spitzer | 308 Full Plate | 6 | None | Rifle |
| 25 caliber (size .257) | | | | |
| Nosler 100 gr Ballistic tip Spitzer | 308 Half Plate | 5A | None | Rifle |
| 6.5 MM (size .264) | | | | |
| Hornady 120 gr ELD Match (Grendel) | 308 Full Plate | 5A | 1 Shim | Rifle |
| Hornady 147 gr ELD Match (creedmoor) | 308 Full Plate | 5A | None | Rifle |
| 223/556 (size .224) | | | | |
| Hornady 40 gr V Max | 223 Plate | 6 | All Shims | Rifle |
| Hornady 50 gr V Max | 223 Plate | 6 | All Shims | Rifle |
| Hornady 55 gr FMJ | 223 Plate | 6 | All Shims | Pistol |
| Hornady 62 gr FMJ | 223 Plate | 6 | All Shims | Pistol |
| Hornady 75 gr BTHP Match | 223 Plate | 6 | None | Rifle |
| Hornady 75 gr V Max | 223 Plate | 7 | None | Pistol |
| Sierra 55 gr Spitzer | 223 Plate | 6 | All Shims | Pistol |
| Sierra 55 gr SP | 223 Plate | 6 | All Shims | Pistol |
| Sierra 77 gr Match King BTHP | 223 Plate | 7 | None | Rifle |
| *** Works best when running half speed & adjusting hopper angle | | | | |
| 20 Cal (size .204) | | | | |
| Hornady 32 gr V Max | 223 Plate | 6 | All Shims | Rifle |
| Hornady 40 gr V Max | 223 Plate | 6 | All Shims | Rifle |

Rifle Notes:
The 223/556 bullets will work with either pistol or rifle ramps, however for longer bullets the rifle ramp works better at faster speeds and the angle of the hopper plays more of a critical role and may need to be increased or decreased depending on the bullet length and speed of the hopper. The Barnes TTSX 180 grain 30 Caliber bullet requires less of an angle for more reliable orientation of the bullet as an example of this, and it applies to all calibers.
AP - Armour Piercing
BT - Boat Tail
CNC - Cast & Coated*
* Cast & Coated means a lead bullet with a polymer coating FIG. 3b illustrates and fixed rifle bullet orientation ramp 311 for use with longer rifle caliber bullets. The fixed rifle bullet orientation ramp 311 consist of a smaller ramp 312 having a lower base closest to the wheel 201 and a larger ramp 313 having a middle point 314 adjacent to a longer end of smaller ramp 312. A cap 315 covers a nut that used to attach the fixed rifle ramp 311 to the bullet loader 101. The use of these smaller ramp 312 and larger ramp 314 are oriented to cause a longer rifle bullet to rotate faster than a single ramp to ensure a longer bullet has completed its motion into a correct orientation for passage to be combined with a casing.

The improved fixed bullet orientation ramp 311 is shown in FIG. 3a and possesses the following dimensions in a preferred embodiment:

| | | |
|---|---|---|
| Base Front Width | 312 | 25.04 mm; |
| Base Rear Width | 313 | 14.39 mm; |
| Base Inside Length | 314 | 38.75 mm; |
| Base Outside Length | 315 | 63.75 mm; |
| Short Inside Ramp Height | 321 | 13.10 mm; |
| Short Inside Ramp Length | 322 | 22.50 mm; |

-continued

| | | |
|---|---|---|
| Short Inside Ramp Width | 323 | 2.00 mm; |
| Tall Outside Ramp Height | 331 | 31.90 mm; |
| Tall Outside Ramp Length | 332 | 36.15 mm; |
| Tall Outside Ramp Width | 333 | 2.45 mm; |
| Tall Outside Ramp Angle | 334 | 45°; and |
| Tall Outside Ramp Intersect | 335 | 12.65 mm. |

FIG. 3c illustrates a location of an improved fixed ramp 301 on a bullet loader 101 relative to the wheel 201. This location and function of fixed ramp 301 and rifle ramp 311 are identical to the location of a ramp described in the above patents to Koskela.

FIG. 4a-f illustrates various embodiments of a bullet orientation block utilizing varying sized spacers according to the present invention. During operation, wheel 201 rotates within a bullet hopper to capture and correctly orient a bullet for passage to a separate set of components that mate the bullet with a casing after it has been filled with a desired amount of propellant. The wheel 201 contains a series of openings around its circumference into which a bullet drops. These openings are size to accommodate a particular bullet caliber size. As the wheel 201 rotates, the bullets that have fallen into these openings follow a path A such that each bullet passes over an orientation collator 406 and a series of grooves 407a-d. These grooves are sized to catch a bullet in a point down orientation and assist in flipping it into a point up orientation. These grooves 407a-d are also sized to permit an outer edge of a bullet already in a point up orientation to pass over without altering the bullet orientation.

These groove 407-d are themselves oriented to direct a point of a bullet to move outward towards a horizontal position as the bullets moves along path A as wheel 201 rotates. When a point of a bullet reaches the end of a groove 407a-d, the bullet point encounters a lower front edge of an improved fixed ramp 404 and continues to lift the point of the bullet as it moves up the ramp. By the time the point of a bullet has reached the raised end of the ramp 404, the center of mass of the bullet has moved enough to cause the bullet to continue to a completely upward orientation within the opening of the wheel 201.

In order for these grooves 407a-d to properly engage the point of a bullet, an inner most point on the groove 407a-d must be positioned to a location along the path A as the bullet moves. Depending upon the bullet caliber size, this inner most point may be different requiring configuration into a proper position each time a different bullet caliber size is to be processed by the bullet loader 101. The grooves 407a-d are located within orientation collator 406 that is part of a configuration block 402. This configuration block 402 may be moved inward and outward from the center of the wheel 201 to adjust the location of the groove. An example of the movement of the configuration block 402 relative to wheel 201 is shown in detail in FIG. 4b.

To make the configuration easier to set the inner most point at a proper location, a preferred embodiment of the present invention utilizes a predetermined sized space 422 to set the location of the innermost point of the groove 407a-d to the desired location. The width of spacer 422 is determined by the bullet caliber size of the bullets being processed. Examples of different spacers having different widths are shown in detail in FIGS. 4c-e.

Tables 1 and 2 above, recite known bullet caliber sizes and the configuration settings to be used to set up bullet loader 101. As discussed above, this data identifies which of the fixed position ramps are to be used for a particular bullet caliber size. This data also identifies a particular spacer size, labeled 1-7 for pistol bullets and 5A for rifle bullets. In a preferred embodiment, each spacer is 54.40 mm long and 8.50 mm high. Table 3 provides thickness dimensions for each of the spacers identified above for the known bullet caliber sized.

TABLE 3

| Spacer Size No. | Dimension (mm) | Bullet Type |
|---|---|---|
| 1 | 3.05 | Pistol |
| 2 | 4.05 | Pistol |
| 3 | 4.60 | Pistol |
| 4 | 4.57 | Pistol |
| 5 | 5.50 | Pistol |
| 6 | 8.25 | Pistol |
| 7 | 9.60 | Rifle |
| 5A | 6.25 | Rifle |

To configure the grooves, release knob 421 is loosened to permit configuration block 402 to move inward and outward from its base. In a preferred embodiment, release knob 421 is 26.60 mm high with a 4 mm screw that is 33 mm in length. Other sizes may be used without deviating from the scope of the present invention as recited in the attached claims. The release knob is coupled to a bolt that screws against the base to hold the configuration block 402 in place. Once the knob 421 is loosened, the configuration block 402 moved outward to permit insertion of a properly sized spacer 422 depending upon the bullet caliber size to be processed. Any currently installed spacer may be removed and a new spacer having the needed width is installed. The configuration block 402 is pressed flush against the spacer 422 and the knob 421 is tightened to hold the configuration block 402 in its proper location. The use of these fixed spacers and configuration data from tables 1 and 2 make setting up the bullet loader 101 simpler and less prone to errors. FIG. 4f illustrates an example embodiment of a configuration block 402 set to a desired location using a spacer according to the present invention.

Figure 5A:
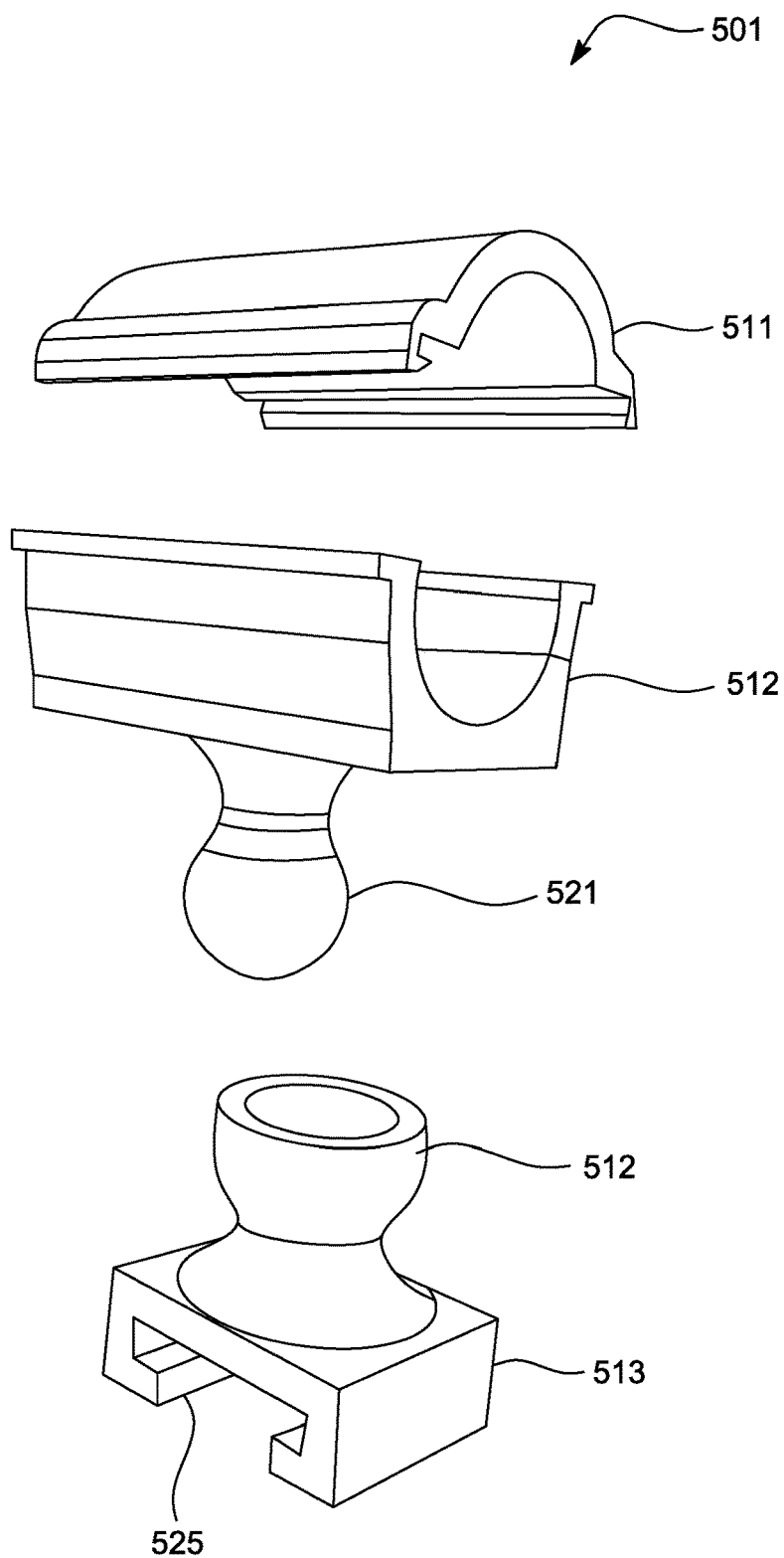
FIG. 5a-b illustrates various embodiments of a bullet path support according to the present invention.
Figure 5B:
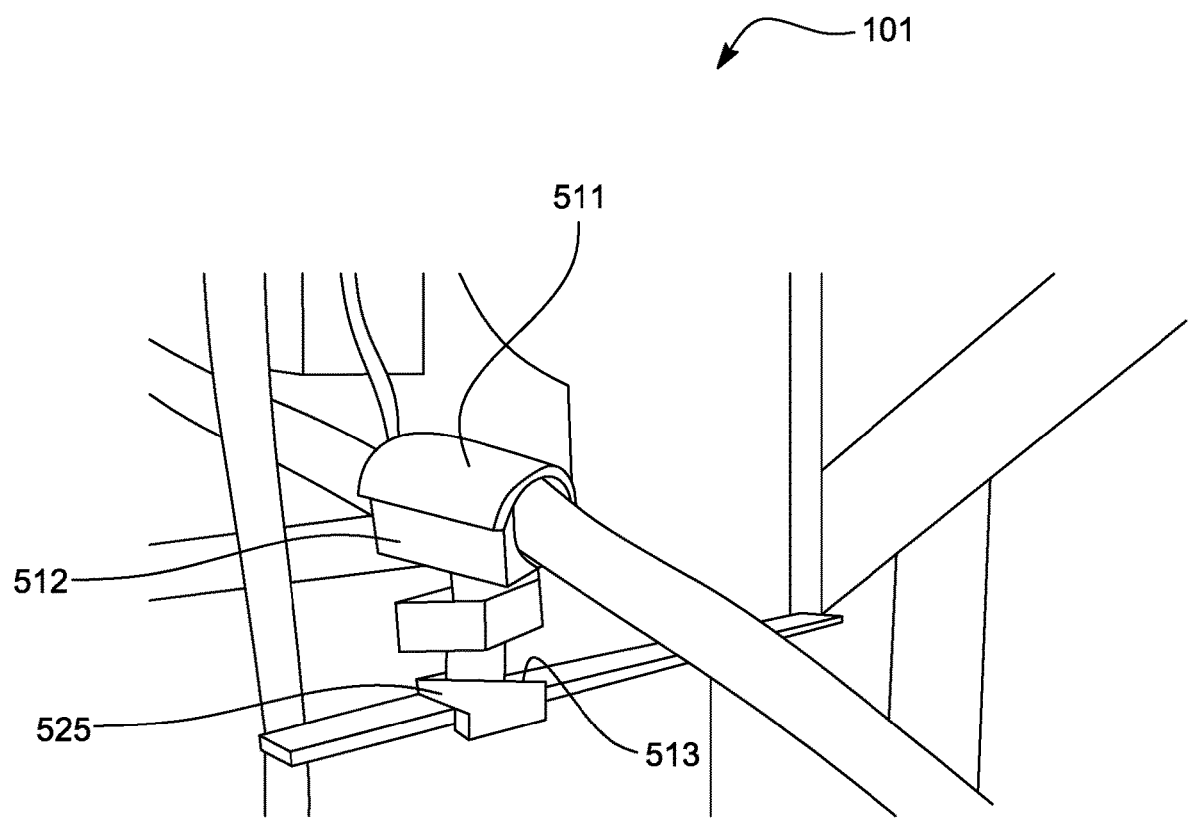

FIG. 5a-b illustrates various embodiments of a bullet path support according to the present invention. Once a bullet has been properly oriented as discussed above, the bullet falls through an opening to transverse a path from a hopper/orientation subsystem to a casing loading subsystem. This path between the two subsystems is typically defined by a hollow tube or spring that has an inner diameter comparable to the bullet caliber sizes. Typically the hopper/orientation subsystem is located above the casing loading subsystem permitting properly oriented bullets to fall via gravity.

The path of travel defined by the tube is generally in a downward direction through the tube which is typically flexible to permit operation is many locations and configurations. As such, restraining the flexible tube into an out of the way and convenient location while maintaining a significantly downward path is required. Any mechanism to restrain the position of the flexible tube must also maintain its inner diameter to permit the free passage of oriented bullets. FIG. 5a illustrates an easily movable and configurable restraint 501 that allows the flexible tube to be restrained along a desired path.

The configurable restraint 501 consists of 3 parts: and an upper tube restraint 511, a lower tube restraint 512, and a mount 513. The upper tube restraint 511 and lower tube restraint 512 may be coupled together at their edges to define an opening 521 through which the flexible tube may pass. The upper tube restraint 511 and lower tube restraint 512 are typically size to match an outer dimension of the flexible tube. These two pieces may be coupled together using any number of connection mechanism. Because the flexible tube is not expected to generate a significant force against these restraints, a preferred embodiment includes a coupling lip on one side of the upper tube restraint 511 and lower tube restraint 512 pair of components that snaps around protruding edge on the corresponding component. Many other coupling mechanisms known in the art may be used to place the restraints together around the flexible tube.

The lower tube restraint 512 also includes a mount connector 522 on one side that mates to a corresponding connection device 523 on mount 513. In the preferred embodiment, the mount connector 522 is a ball that fits into a ball socket that acts as the corresponding connection device 523. Such a connection mechanism provides an easy means to change the orientation of the upper tube restraint 511 and lower tube restraint 512 combination from the mount. A second side 524 of the mount 513 includes an attachment mechanism 525 for coupling the mount to a secure location to restrain the flexible tube. In the preferred embodiment, the attachment mechanism 525 is a slot to surround a straight, rigid member found on or near the bullet loader 101. Many other known devices may be used for attachment mechanism 525. FIG. 5b illustrates an example embodiment for use of the above restraint mechanism for the flexible tube disclosed herein.

Figure 6A:
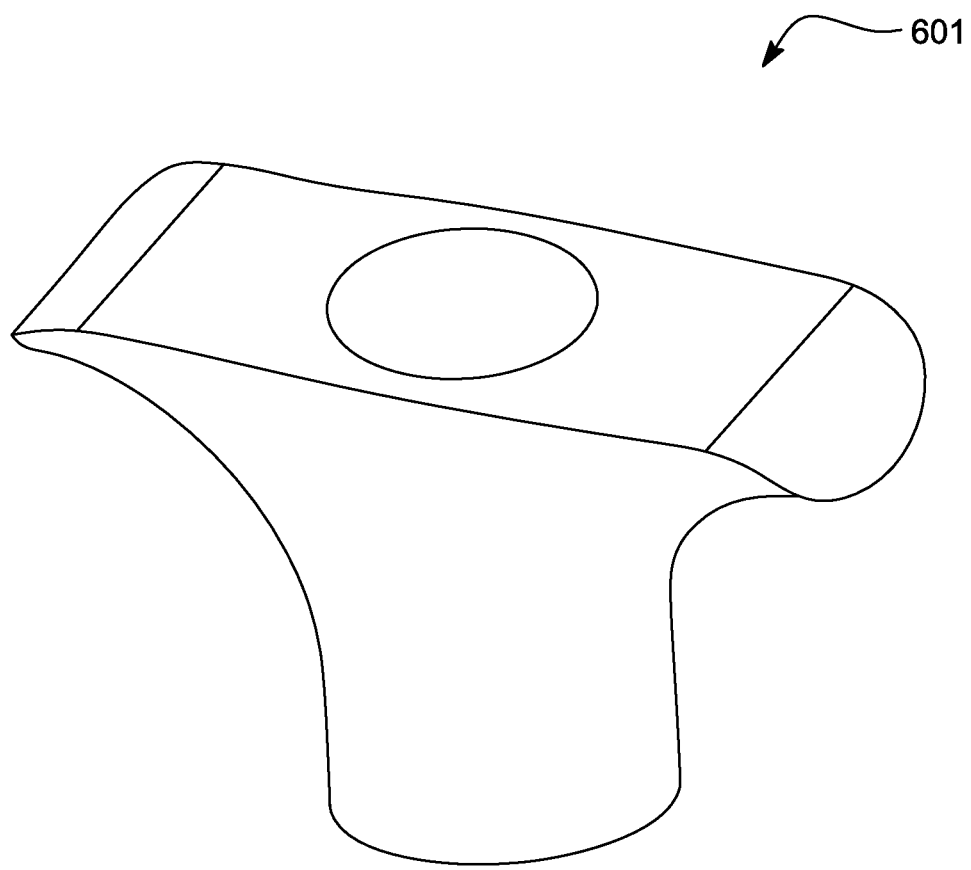
FIG. 6a-b illustrates various embodiments of a wheel removal handle according to the present invention.
Figure 6B:
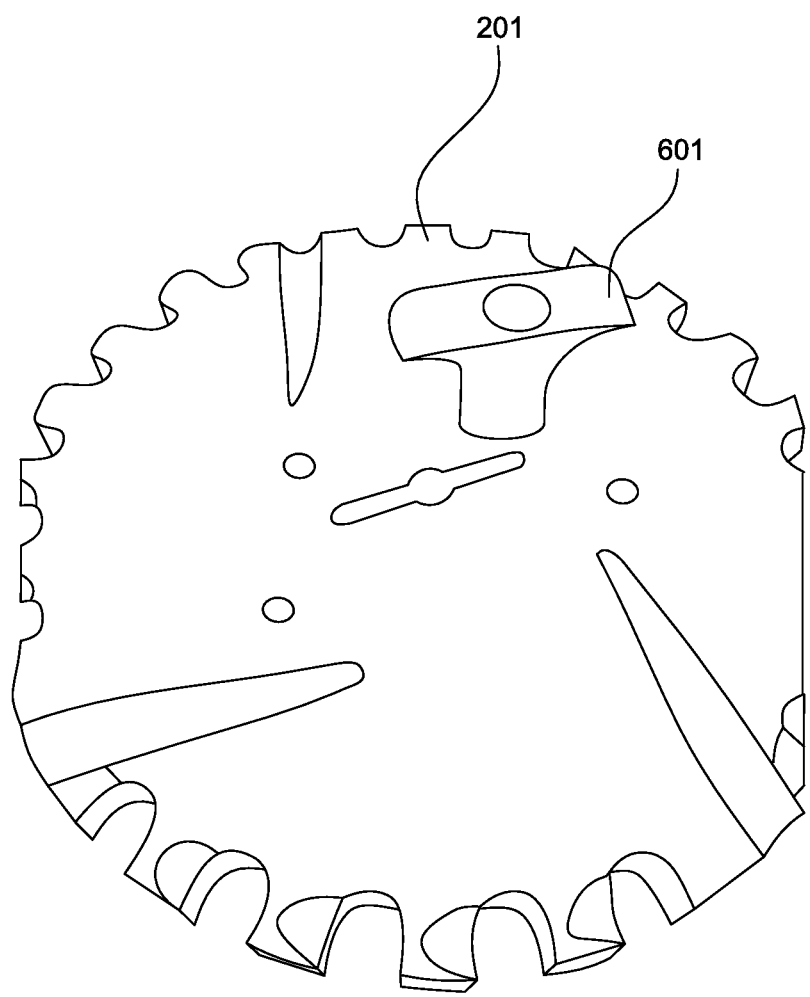

FIG. 6a-b illustrates various embodiments of a wheel removal handle according to the present invention. As noted above, different bullet caliber sizes use different rotating wheels 201 to provide openings sized appropriately to allow the rotation of the wheel 201 to properly orient the bullets for passage to the casing loading subsystem. Existing solutions lack a mechanism to easily permit the removal of one wheel 201 and replace it with a different sized wheel. Prior mechanism used to lift and inert wheels into the hopper/orientation subsystem were external devices to reach into and remove a wheel.

FIG. 6a illustrates a wheel handle 601 that may be permanently attached to a wheel 201 while permitting operation of the wheel in the hopper/orientation subsystem. The wheel 201 possesses several thru holes that may be used along with a screw to attach a handle 601 to the wheel. When a handle 601 is attached towards the center of the wheel 201, the handle 601 movement while the hopper/orientation subsystem is operating will keep the handle a sufficient distance away from the edge of the wheel 201, and its openings that are used to orient a bullet. Addition of such a handle permanently upon a wheel 201 reduces the effort and time needed to switch wheels when different bullet caliber sizes are to be processed by the bullet loader 101. FIG. 6b illustrates an example wheel 201 that possess an attached handle 601 while the wheel is not installed within the hopper/orientation subsystem.

Figure 7A:
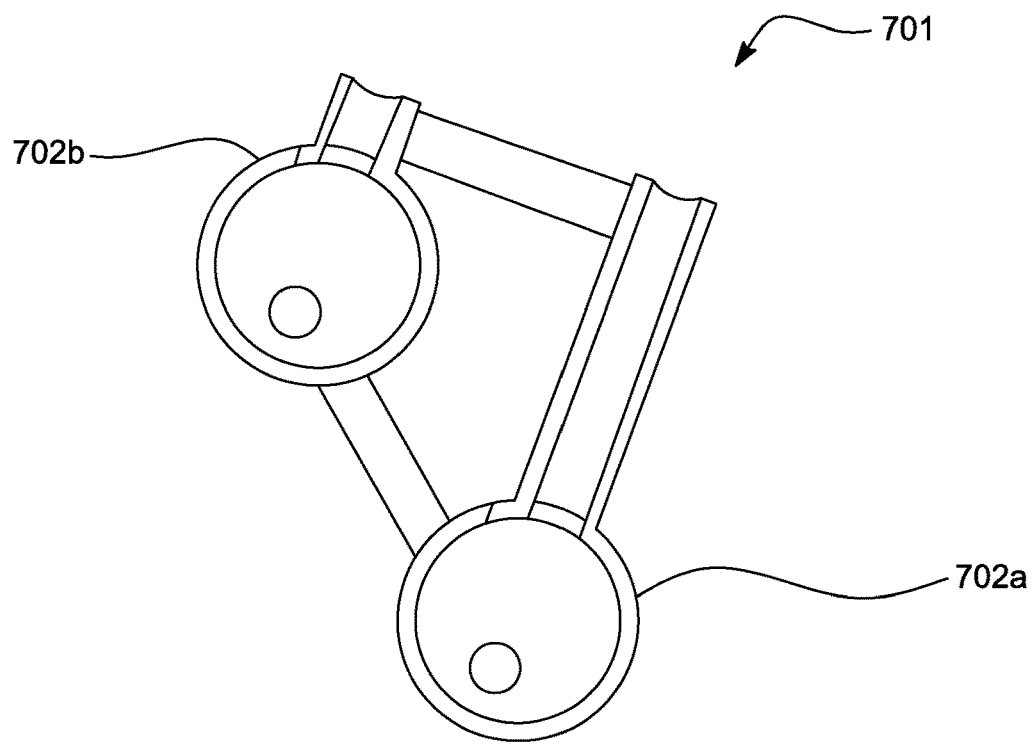
FIG. 7a-7f illustrates various embodiments of a bullet loader orientation jigs according to the present invention.
Figure 7B:
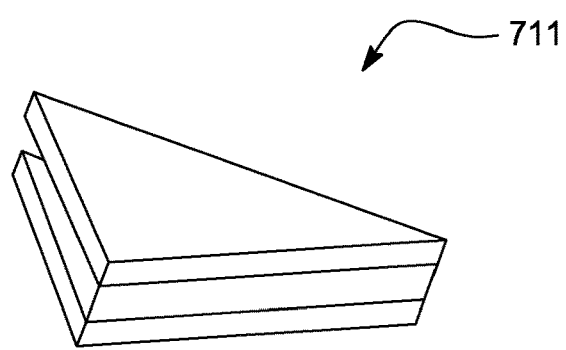
Figure 7C:
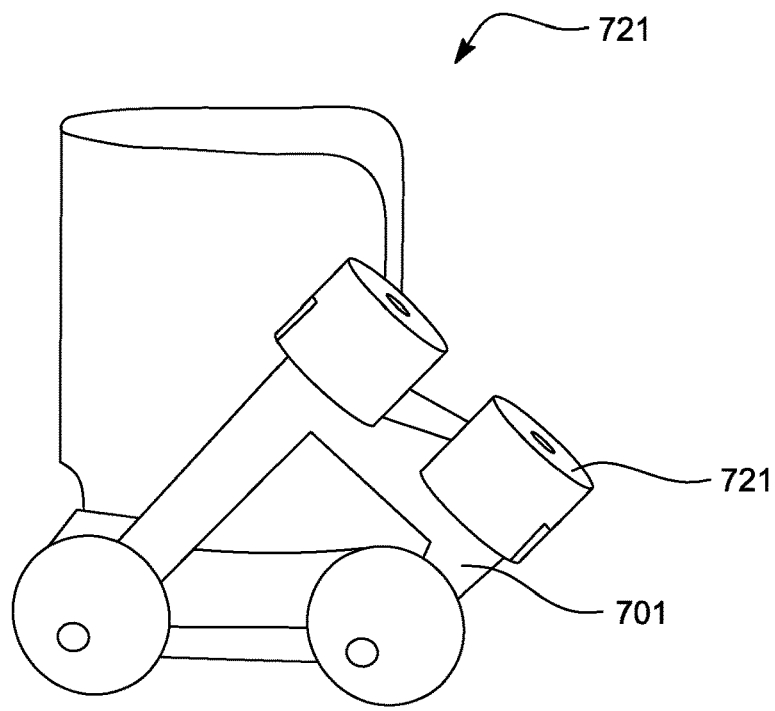
Figure 7D:
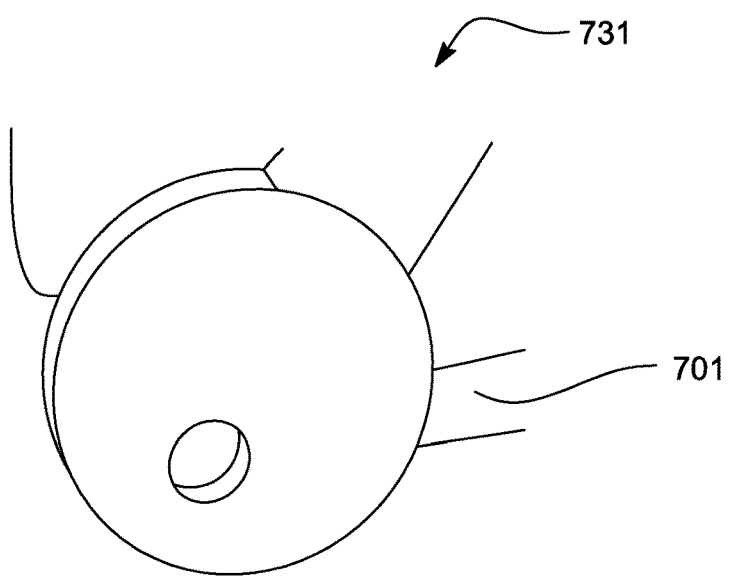
Figure 7E:
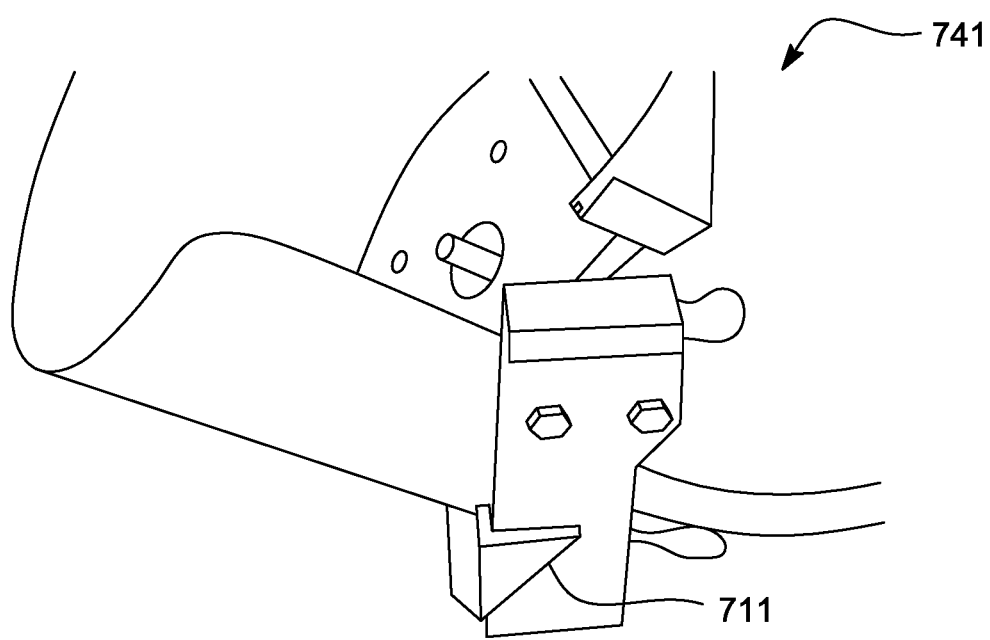
Figure 7F:
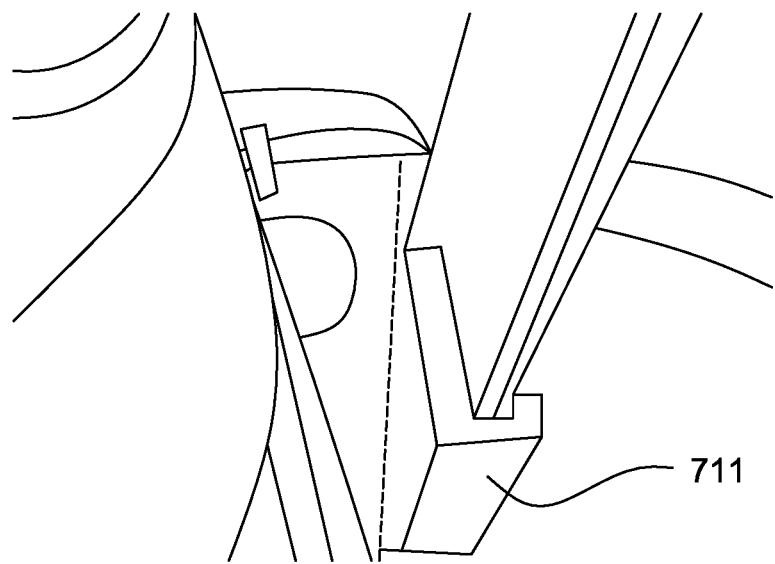

FIG. 7a-d illustrates various embodiments of a bullet loader orientation jigs according to the present invention. Because the bullet loader 101 utilizes gravity to move the properly oriented bullets from the hopper/orientation subsystem, the hopper must be oriented in a desired position to ensure that bullets may easily fall from the wheel 201 int the flexible tube as discussed above. In different embodiments of the prior art bullet loaders, different mechanisms are used to support the hopper in position. FIG. 7a illustrates one embodiment of orientation jig 701 used with a first embodiment of the bullet hopper 101. Jig 701 is used to configure the hanging mechanism 721 utilizing two cylindrical supports shown in FIG. 7c-d. FIG. 7b illustrates a second embodiment of orientation jig 711 used with a first embodiment of the bullet hopper 101. Jig 711 is used to configure the hanging mechanism utilizing straight support members 741 shown in FIG. 7e.

The jigs 701, 711 simply help position the bullet hopper on the hanger at the proper angle to allow the bullets to fall into the collator plate and then proceed around the hopper until they either fall into the nose guide and begin to rotate to flip upward or if they are already correctly oriented to continue to the drop point the only reason for the holes is it's part of the hanger assembly.

While the above embodiments of the present invention describe a bullet loader apparatus, one skilled in the art will recognize that the use various modifications to the ramp, spacers, and related components of a bullet loader may be used with the present invention as claimed. It is to be understood that other embodiments may be utilized, and operational changes may be made without departing from the scope of the present invention.

Unless explicitly stated otherwise, each numerical value and range should be interpreted as being approximate as if the word "about" or "approximately" preceded the value or range.

Unless otherwise indicated, all numbers expressing quantities of ingredients, properties such as molecular weight, percent, ratio, reaction conditions, and so forth used in the specification and claims are to be understood as being modified in all instances by the term "about," whether or not the term "about" is present. Accordingly, unless indicated to the contrary, the numerical parameters set forth in the specification and claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in the testing measurements.

It will be further understood that various changes in the details, materials, and arrangements of the parts which have been described and illustrated in order to explain embodiments of this invention may be made by those skilled in the art without departing from embodiments of the invention encompassed by the following claims.

In this specification including any claims, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

What is claimed is:

1. A bullet-orienting apparatus for orienting bullets comprising a tip-end and a base-end, the apparatus comprising:
a bullet conveyance comprising a wheel having a perimeter defining one or more notches wherein each notch is sized to accommodate a bullet resting with either its tip-end or its base-end facing a nose plate when the notch is positioned above the nose plate; and
a bullet-orienting structure positioned adjacent the bullet conveyance such that a bullet conveyed from an upstream location to a downstream location by the bullet conveyance interacts with the bullet-orienting structure, wherein the bullet-orienting structure comprises:
the nose plate that extends at least partially below the wheel and being movable relative to the wheel, wherein the nose plate defines a tapered opening and a groove having a first end and a second end, wherein the first end of the groove is disposed adjacent to the tapered opening and wherein the tapered opening is positioned such that it is partially extends beneath the perimeter of the wheel and such that a bullet positioned in a notch of the wheel and oriented with its tip-end facing toward the tapered opening would fall into the tapered opening and such that a bullet positioned in a notch of the wheel and oriented with its base-end facing toward the tapered opening would not fall into the tapered opening;
a spacer adjacent to the nose plate below the wheel to orient the nose plate such that the groove is located in a position corresponding to a bullet caliber size to be processed; and
a fixed location ramp having a first end and a second end, wherein the first end of the ramp is disposed adjacent to the second end of the groove, wherein the ramp is positioned downstream from the tapered opening, and wherein a bullet positioned in a notch with its base-end facing toward the tapered opening would interact with the ramp;
wherein the fixed location ramp comprises a pistol bullet ramp and a rifle bullet ramp.

2. The bullet-orienting apparatus according to claim 1, wherein the bullet orienting structure further comprises a rotating knob having a thru screw to attach the nose plate into a desired location after the spacer has been installed.

3. The bullet-orienting apparatus according to claim 1, wherein the rifle bullet ramp comprises:
a longer outside ramp having a first front edge and a rising slope to a first back edge; and
a shorter inside ramp having a second front edge and a rising slope to a second back edge, the second back edge being adjacent to an intersection point along a front side of the longer outside ramp, and a front side of the shorter inside ramp oriented from the front side of the longer outside ramp at an angle of 45° measured between the first front edge and the second front edge.

4. The bullet-orienting apparatus according to claim 3, wherein the rifle bullet ramp further comprises solid base and ramp components having the following dimensions of approximately:

| | |
|---|---|
| a base front width | 25.04 mm; |
| a base rear width | 14.39 mm; |
| a base inside length | 38.75 mm; |
| a base outside length | 63.75 mm; |
| a shorter inside ramp height | 13.10 mm; |
| a shorter inside ramp length | 22.50 mm; |
| a shorter inside ramp width | 2.00 mm; |
| a longer outside ramp height | 31.90 mm; |
| a longer outside ramp length | 36.15 mm; |
| a longer outside ramp width | 2.45 mm; and |
| a longer outside ramp intersection point | 12.65 mm. |

5. The bullet-orienting apparatus according to claim 1, wherein the pistol bullet ramp comprises a solid ramp having the following dimensions of approximately:

| | |
|---|---|
| an outside height | 36.50 mm; |
| an inside length | 42.45 mm; |
| an outside edge radius length | 53.50 mm; |
| an inside edge radius length | 42.45 mm; |
| a front length | 22.80 mm; |
| a back length | 26.00 mm; |
| a lower edge length | 23.04 mm; and |
| a front ledge height | 2.0 mm. |

6. The bullet-orienting apparatus according to claim 1, wherein the spacer comprises a solid item having a width corresponding to the bullet caliber size being processed.

7. The bullet-orienting apparatus according to claim 1, wherein the wheel comprises a flat rotating disk and a handle coupled to a top side of the disk perpendicular to the top side of the disk.

8. The bullet-orienting apparatus according to claim 7, wherein the handle being permanently attached to the wheel using a bolt inserted into a thru hole in the disk.

9. The bullet-orienting apparatus according to claim 1, the pistol ramp and the rifle ramp are substituted for each other depending upon the bullet caliber size being processed.

10. Apparatus comprising:
a bullet conveyance conveying bullets along a bullet conveyance path from an upstream location to a bullet-receiving opening at a downstream location, the bullets each including a tip end having a first width and a base end having a second width greater than the first width, the bullet conveyance taking up the bullets in tip down and tip up orientations whereby each of the bullets taken up by the bullet conveyance in the tip up orientation comprises a tip up bullet and each of the bullets taken up by the bullet conveyance in the tip down orientation comprises a tip down bullet; and
bullet-orienting structure interacting with each tip down bullet conveyed along the bullet conveyance path by the bullet conveyance between the upstream location and the downstream location rotating each tip down bullet relative to the bullet conveyance from the tip down orientation to the tip up orientation, the bullet-orienting structure comprising:
a nose plate that extends at least partially below the wheel and being movable relative to the wheel, wherein the nose plate defines a tapered opening and a groove having a first end and a second end, wherein the first end of the groove is disposed adjacent to the tapered opening and wherein the tapered opening is positioned such that it is partially extends beneath the perimeter of the wheel and such that a bullet positioned in a notch of the wheel and oriented with its tip-end facing toward the tapered opening would fall into the tapered opening and such that a bullet positioned in a notch of the wheel and oriented with its base-end facing toward the tapered opening would not fall into the tapered opening;
a spacer adjacent to the nose plate below the wheel to orient the nose plate such that the groove is located in a position corresponding to a bullet caliber size to be processed;
a rotating knob having a thru screw to attach the nose plate into a desired location after the spacer has been installed; and
a groove receiving the tip of each tip down bullet initially rotating each tip down bullet out of the tip down orientation toward the tip up orientation; and
a fixed location ramp receiving the tip of each tip down bullet initially rotated from the groove rotating each tip down bullet into the tip up orientation;
wherein
the fixed location ramp comprises a pistol bullet ramp and a rifle bullet ramp;
the rifle bullet ramp comprises:
a longer outside ramp having a first front edge and a rising slope to a first back edge; and
a shorter inside ramp having a second front edge and a rising slope to a second back edge, the second back edge being adjacent to an intersection point along a front side of the longer outside ramp, and a front side of the shorter inside ramp oriented from the front side of the longer outside ramp at an angle of 45° measured between the first front edge and the second front edge;

the pistol bullet ramp comprises a solid ramp having the following dimensions of approximately:

| | |
|---|---|
| an outside height | 36.50 mm; |
| an inside length | 42.45 mm; |
| an outside edge radius length | 53.50 mm; |
| an inside edge radius length | 42.45 mm; |
| a front length | 22.80 mm; |
| a back length | 26.00 mm; |
| a lower edge length | 23.04 mm; and |
| a front ledge height | 2.0 mm; | the spacer comprises a solid item having a width corresponding to the bullet caliber size being processed; and the wheel comprises a flat rotating disk and a handle coupled to a top side of the disk perpendicular to the top side of the disk.

\* \* \* \* \*